United States Patent [19]

Brown et al.

[11] Patent Number: 5,219,550

[45] Date of Patent: Jun. 15, 1993

[54] PRODUCTION OF LOW BORON LITHIUM CARBONATE FROM LITHIUM-CONTAINING BRINE

[75] Inventors: Patrick M. Brown, Exton; Daniel A. Boryta, Downingtown, both of Pa.

[73] Assignee: Cyprus Foote Mineral Company, Malvern, Pa.

[21] Appl. No.: 623,268

[22] Filed: Dec. 6, 1990

Related U.S. Application Data

[63] Continuation of Ser. No. 332,007, Mar. 31, 1989, abandoned.

[51] Int. Cl.$^5$ .............................. C01D 15/08
[52] U.S. Cl. .................. 423/419 R; 423/421; 423/429; 423/179.5; 423/209
[58] Field of Search ............ 423/419 R, 421, 429, 423/642, 179.5, 182, 209

[56] References Cited

U.S. PATENT DOCUMENTS

| | | | |
|---|---|---|---|
| 2,793,934 | 5/1957 | Cunningham | 423/179.5 |
| 2,969,275 | 1/1961 | Garrett | 423/179.5 |
| 3,111,383 | 11/1963 | Garrett et al. | 423/179.5 |
| 3,268,289 | 8/1966 | Macey | 423/179.5 |
| 3,297,737 | 1/1967 | Weck | 260/462 |
| 3,306,712 | 2/1967 | Goodenough et al. | 423/181 |
| 3,336,115 | 8/1967 | Reburn et al. | 423/179.5 |
| 3,370,093 | 2/1968 | Longoria, III | 260/611 |
| 3,479,294 | 11/1969 | Weck | 252/182 |
| 3,523,751 | 8/1970 | Burkert et al. | 423/179.5 |
| 3,855,392 | 12/1974 | Folkestad et al. | 423/497 |
| 3,981,929 | 9/1976 | Davis et al. | 568/750 |
| 4,243,392 | 1/1981 | Brown et al. | 23/295.5 |
| 4,261,960 | 4/1981 | Boryta | 423/179.5 |
| 4,261,961 | 4/1981 | Davis | 423/181 |
| 4,271,131 | 6/1981 | Brown et al. | 423/164 |
| 4,274,834 | 6/1981 | Brown et al. | 423/179.5 |
| 4,287,163 | 9/1981 | Garrett et al. | 423/179.5 |
| 4,324,771 | 4/1982 | Barlow et al. | 423/157 |
| 4,588,566 | 5/1986 | Kluksdahl | 423/421 |
| 4,980,136 | 12/1990 | Brown et al. | 423/179.5 |

FOREIGN PATENT DOCUMENTS

| | | | |
|---|---|---|---|
| 115415 | 12/1963 | Fed. Rep. of Germany | 423/179.5 |
| 62-252315 | 11/1987 | Japan | 423/421 |
| 2190668 | 11/1987 | United Kingdom | 423/421 |

OTHER PUBLICATIONS

D. S. Arnold "Process Control in Boric Acid Extraction" Dec. 5, 1966.
D. S. Arnold—"A New Process for the Production of Boric Acid" Oct. 23, 1964.
C. R. Havighorst—"AP & CC New Process Separates Borates From Ore by Extraction" Nov. 11, 1963.
R. R. Grinstead "Removal of Boron and Calcium from Magnesium Chloride Brines by Solvent Extraction" Nov. 4, 1972 (Indus. Eng. Chem. Dev.–vol. 11, No. 4, 1972 pp. 454–460.
N. C. Nelson and J. E. Hudgens "Liquid-Liquid Extraction of Boric Acid Using Aliphatic Alcohols'-'–Quaterly Progress Report for Period ending Mar. 31, 1953, New Brunswick Lab. pp. 24–32-34.
Kozerchuk et al. "Extracting Boron From Magnesium Chloride Brines", 1981 (abstract only).
Sologubenko et al. "Study of the Extraction Purification of Magnesium Chloride Solutions by Removing Boron"–1980.
Kristanova, et al. "Extraction of Boron from Bulgarian Natural Brines with Two-Ethylhexanol"–1984 (abstract only).
Petrov, et al. "Removal of Boron from Magnesium Chloride Solutions by Liquid Extraction"–1977 (abstract only).
Smirov et al. "Development of Technology for Extracting Boron From Hydro Minerals"–1982 (abstract only).

Primary Examiner—Robert Kunemund
Attorney, Agent, or Firm—Howson and Howson

[57] ABSTRACT

The present invention relates to a novel process for producing, from a lithium-containing brine, a low boron lithium carbonate compound. This compound is particularly useful for conversion to a highly pure lithium chloride for the production of lithium metal by electrolysis.

11 Claims, No Drawings

PRODUCTION OF LOW BORON LITHIUM CARBONATE FROM LITHIUM-CONTAINING BRINE

This is a continuation of application Ser. No. 07/332,007, filed on Mar. 31, 1989, now abandoned.

The present invention relates to a novel process for producing, from a lithium-containing brine, a low boron lithium carbonate compound.

BACKGROUND OF THE INVENTION

Lithium metal has many industrial uses including, e.g., employing a blanket of the liquid metal for breeding purposes in nuclear fusion reactors in the nuclear power industry. Additionally, lithium metal is used in lightweight, compact primary and secondary lithium batteries for military and commercial applications and as a degasifier in the production of high-conductivity copper and bronze. Another use of this metal is in the synthesis of organometallic compounds for applications in the fields of rubber, plastics and medicines. Lithium metal is generally produced for such uses by electrolysis of an eutectic mixture of highly pure molten lithium chloride and potassium chloride.

Naturally occurring brines found, e.g., in the United States and Chile, contain reasonable concentrations of lithium, in the form of lithium chloride. These brines are viable reserves for lithium recovery. These brines also contain varying amounts of boron, calcium and other components. Some typical components of naturally occurring brines are identified in the Table below entitled "Saline Brine Analyses".

TABLE

| SALINE BRINE ANALYSES Weight Percent | | | | | | | |
|---|---|---|---|---|---|---|---|
| | Ocean | Dead Sea Israel | Great Salt Lake Utah | Bonneville Utah | Geothermal Salton Sea California | Silver Peak Nevada | Atacama Brine Chile |
| Na | 1.05 | 3.0 | 7.0 | 9.4 | 5.71 | 6.2 | 7.17 |
| K | 0.038 | 0.6 | 0.4 | 0.6 | 1.42 | 0.8 | 1.85 |
| Mg | 0.123 | 4.0 | 0.8 | 0.4 | 0.028 | 0.02 | 0.96 |
| Li | 0.0001 | 0.002 | 0.006 | 0.007 | 0.022 | 0.02 | 0.15 |
| Ca | 0.040 | 0.3 | 0.03 | 0.12 | 2.62 | 0.02 | 0.031 |
| SO$_4$ | 0.25 | 0.05 | 1.5 | 0.5 | 0.00 | 0.71 | 1.46 |
| Cl | 1.900 | 16.0 | 14.0 | 16.0 | 15.06 | 10.06 | 16.04 |
| Br | 0.0065 | 0.4 | 0.0 | 0.0 | 0.0 | 0.002 | 0.005 |
| B | 0.0004 | 0.003 | 0.007 | 0.007 | 0.039 | 0.005 | 0.04 |
| Li/Mg | 1/12720 | 1/2000 | 1/135 | 1/60 | 1/1.3 | 1/1 | 1/6 |
| Li/K | 1/3800 | 1/300 | 1/70 | 1/90 | 1/71 | 1/20 | 1/12 |
| Li/Ca | 1/400 | 1/150 | 1/5 | 1/17 | 1/119 | 1/1 | 1/0.2 |
| Li/B | 1/4 | 1/1.5 | 1/1.2 | 1/1 | 1/1.8 | 1/0.25 | 1/0.27 |

Some of these brines have high concentrations of lithium and a low magnesium to lithium ratio, generally about 1:1 to 6:1, which allow for a simplified process of concentrating, purifying and recovering lithium chloride brine. Lithium carbonate is then obtained by treatment of the brine with soda ash.

In a well-known method for preparing lithium metal, the lithium carbonate is converted to lithium hydroxide via a liming process. The lithium hydroxide is then converted to lithium chloride by treatment with hydrochloric acid followed by drying. All of these steps are utilized to obtain lithium chloride of sufficient purity for use in the electrolytic production of lithium metal from lithium chloride.

The impurities, such as, magnesium, calcium, sodium, sulfate and boron present in lithium containing natural brines, should be minimized to produce a lithium chloride product suitable for production of lithium metal by electrolysis. Alkali and alkaline earth metals, such as sodium, magnesium and calcium, must be substantially removed, otherwise, they will report as contaminants in the lithium metal. Simple technical means for their removal from the metal are not cost effective.

During electrolysis of lithium chloride, non-volatile anions will accumulate, resulting in rapid short-circuiting of the cell. For example, boron normally contained in lithium carbonate made from brines has a negative impact on subsequent use of the lithium carbonate for many applications. The boron content is particularly detrimental to lithium chloride produced from lithium carbonate for lithium metal production. The non-volatile borate anion in the electrolytic cell accumulates as deposits in the cell and thereby increases resistivity and decreases current efficiency in the cell, resulting in premature shut down of the cell. These losses in efficiency and premature shut down undesirably increase the cost of lithium metal production. Desirably, boron concentrations in electrolytic cells should be 25 ppm or less of boron, equivalent to about 100 ppm or less of borate ion.

As presently practiced in the industry, boron is removed from, or substantially reduced in, lithium chloride brine on a commercial basis by first converting the lithium chloride brine containing substantial impurities into lithium carbonate via a process of precipitation of lithium carbonate with soda ash. The lithium carbonate is subsequently converted to lithium hydroxide by lime treatment of lithium carbonate to produce lithium hydroxide and waste calcium carbonate. Crystallization of the lithium hydroxide substantially removes the boron and alkali metal impurities by way of a bleed stream. The lithium hydroxide is then treated with hydrochloric acid to produce lithium chloride or treated with CO$_2$ to produce high purity lithium carbonate. These conversions are accomplished according to the following series of reactions:

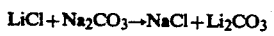
$$LiCl + Na_2CO_3 \rightarrow NaCl + Li_2CO_3 \quad\quad 1$$

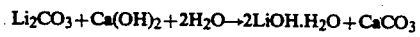
$$Li_2CO_3 + Ca(OH)_2 + 2H_2O \rightarrow 2LiOH \cdot H_2O + CaCO_3 \quad\quad 2$$

$$LiOH \cdot H_2O + HCL \rightarrow LiCl + 2H_2O \quad\quad 3$$

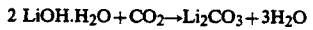
$$2\,LiOH \cdot H_2O + CO_2 \rightarrow Li_2CO_3 + 3H_2O \quad\quad 4$$

Lithium carbonate crystals precipitated from lithium chloride brines containing boron typically retain a contaminating quantity of lithium borate. For example, purified lithium containing brines produced in Nevada, U.S.A. and in Chile contain approximately 7,000 ppm of lithium and approximately 2,000 ppm of boron. Lithium carbonate produced from such brines normally contains about 0.04% boron, which exists as approximately 0.2% lithium borate. Therefore, precipitation of lithium carbonate is not an adequate means by which boron can be excluded from the resultant lithium salt.

A number of additional methods for boron removal have been used in the field of lithium metal manufacture. Among such methods include treatment of a brine with slaked lime to precipitate calcium borate and/or, where brines contain substantial magnesium impurities, magnesium borate. Attempts to absorb borates on clays, on $HCO_3-$ and Cl type resins, or on activated alumina in the presence of magnesium have also been employed to reduce the boron content of brines. Another unsatisfactory method is precipitating borate as a borophosphate concentrate by treating the brine with lime in combination with phosphoric acid. Brines have also been acidified to precipitate boric acid, and treated by solvent-solvent extraction, i.e. with n-butanol. None of these methods have proven to be cost effective for widespread commercial application.

As an example of efforts extant in the art to remove boron from lithium-containing brines, U.S. Pat. No. 4,261,960 discloses the removal of boron, as well as magnesium and sulfate, by treatment of the brine with an aqueous slurry of slaked lime and an aqueous solution of calcium chloride, followed by concentrating. U.S. Pat. No. 3,885,392 discloses the extraction of boron from magnesium chloride solutions which contain no lithium by contacting the solution with a solution, in petroleum ether, of a fatty alcohol like iso-octyl alcohol.

In addition, other methods for removal of borates and boric acids from brines of Searles Lake are described in D. S. Arnold, "Process Control in Boric Acid Extraction", *Metallurgical Society Conferences*, Vol. 49, 125–140, Gordon and Breach, Science Publishers, New York, (1968) [Hydrometallurgy Session, Second Annual Operating Conference, The Metallurgical Society of AIME, Philadelphia, Pa., Dec. 5–8, (1966)]. See, also, D. S. Arnold, "A New Process for the Production of Boric Acid", 19th Annual Technical Meeting, South Texas Section of AIChE, Galveston, Tex. (Oct. 23, 1964); C. R. Havighorst, "Kirkpatrick Award Winner-/AP&CC's New Process Separates Borates from Ore by Extraction", *Chemical Engineering*, 70, 228–232 (Nov. 11, 1963). In addition other publications and U.S. patents on boric acid extraction date from the early 60's, including U.S. Pat. Nos. 2,969,275; 3,111,383; 3,297,737; 3,336,115; 3,370,093; 3,436,344; 3,479,294 and 4,261,961.

Applying known methods of boron removal to the concentrated brines of Silver Peak, Nev. which contain only 0.6% lithium, for example, requires almost 40 pounds of brine for production of one pound of lithium carbonate. In addition, these brines are not saturated in lithium chloride and therefore result in substantial solubilities of extractant, providing an additional economic penalty.

Although lithium brines are normally the source for low cost lithium carbonate, the resulting lithium chloride obtained from the lithium carbonate from brine has not been satisfactory for the production of lithium metal by way of electrolysis due to the presence of the borate ion.

Thus, although there are many means for boron removal from lithium-containing brines, none to date are commercially satisfactory for producing low boron lithium carbonate because of technological difficulty, inadequate purity of end product, or excessive cost. There remains, therefore, a need in the art for a satisfactory method for production of a boron-free lithium carbonate compound from lithium-containing brines.

SUMMARY OF THE INVENTION

A principal aspect of the present invention provides an economical process for the production, from lithium containing brine, of a lithium carbonate substantially free of boron.

Another aspect of the present invention provides a process for substantially removing boron from a lithium containing brine.

Still another aspect of the present invention is a lithium containing brine substantially free of boron and from which a low boron lithium carbonate may be precipitated.

Other aspects and advantages of the present invention including a novel low boron lithium carbonate, will become apparent from a consideration of the following detailed description and claims.

DETAILED DESCRIPTION OF THE INVENTION

The present invention provides a novel process for producing a low boron, lithium carbonate compound from lithium containing brine. The steps of this process include first contacting a lithium chloride brine concentrated to a lithium content of from about 2 to about 7.0% Li, by weight, with an organic solution of from about 5 to about 40%, by volume, of a fatty alcohol containing from 6 to 16 carbon atoms in kerosene at an organic solution to brine volume ratio of between about 1 and about 5 to 1 to extract boron from the brine to the organic solution phase.

The organic solution phase is then separated from the brine, stripped of its boron content by mixing with water, and recycled. Any magnesium and calcium present in the brine is then substantially removed and lithium carbonate is precipitated from the brine by adding sodium carbonate.

The resulting lithium carbonate is thereafter separated from the aqueous phase and dried. The low boron content of the resulting lithium carbonate makes it a more desirable product of commerce for use in electrolytic cells and lithium metal production.

The starting material for the present process is a raw, natural lithium brine, such as that occurring in Silver Peak, Nev., U.S.A. and in the Salar de Atacama in northern Chile. These natural lithium-containing brines contain boron, usually in the form of borate ion and one or more other metals, usually in the form of chlorides. Concentration of the naturally occurring lithium brines may be accomplished by evaporation of water as by heating or through solar energy in ponds. Once the brine is concentrated, for example, magnesium may be present as $MgCl_2$ hexahydrate; calcium may be present as $CaCl_2$ hexahydrate; strontium may be present as $SrCl_2$ hexahydrate. The lithium itself is present as LiCl trihydrate.

According to the present invention, the brine is concentrated by solar evaporation or other conventional means to a lithium concentration of from about 2 to about 7%. Preferably for use in the present invention, the brine's lithium concentration is from about 4 to about 6.5% by weight.

As the brine is concentrated, substantially all of the free water is removed and the water remaining is essentially present as water of hydration. Removal of free water from the brine results in the saturation of the resulting "aqueous" phase with the metal salt hydrates present in the brine. The "aqueous" phase is, in a sense, a molten mixture of these metal hydrates at room temperature.

To accomplish this concentration with minimal lithium loss, any sulfate that might be present in the original brine is preferably substantially removed. The concentration of the brine, or at least the major portion thereof, is preferably conducted in the substantial absence of sulfate in the brine. Sulfate may be removed by conventional methods known to one of skill in the art, for example, by adding lime or $CaCl_2$ to precipitate gypsum, $CaSO_4 \cdot 2H_2O$.

For effective removal of boron in the practice of this invention, the brine should be sufficiently acidic, so that the boron is present as boric acid. Therefore, the concentrated brine will have a pH of about 1-2 when measured upon dilution with 10 volumes of water. A common acid, preferably one that will not produce contaminating precipitates, like HCl, HBr, $HNO_3$, and the like, may be used to adjust the pH of the brine to an acceptable range. The use of the chloride ion, as associated with hydrochloric acid, is preferred for this purpose.

The concentrated lithium brine is, according to the process of the present invention, mixed with a solution, in kerosene, of a fatty alcohol insoluble in the melange of these metal salt hydrates. Such a fatty alcohol contains from 6 to 16 carbon atoms. In a preferred embodiment, the fatty alcohol contains from 7 to 12 carbon atoms. Exemplary fatty alcohols for use in the process of this invention include, without limitation, branched chain hexanols, lauryl alcohol, 2-ethylhexanol, isononyl alcohol and iso-octyl alcohol. A presently preferred alcohol is iso-octyl alcohol.

The concentration of the alcohol in the kerosene according to this invention is from about 5 to about 40%, by volume. A preferred alcohol concentration is from about 5 to about 20%, by volume. The above ranges include narrower ranges within 5 to 40%, including, e.g., from 10 to 40% or 10 to 20% by volume of the alcohol. The coefficient of extraction (i.e., the concentration of boron in the organic phase divided by the concentration of boron remaining in the aqueous or brine phase) determines the number of times the extraction step will be repeated. However, the use of the lower concentrations of alcohol in the range may require the use of more extractions with the organic solution phase due to the reduced dissolution of boron by the alcohol. The upper figure of alcohol concentration, 40%, is dictated by the onset of significant dissolution of lithium into the organic phase. Hence, a presently preferred upper limit is about 20%.

The relative proportion of organic solution to brine is between about 1 to about 5 to 1, by volume. Preferably this ratio is between about 2:1 and about 4:1, by volume.

Contact between the brine concentrate and the alcohol solution preferably involves agitation and counter current flow. Mixing of the alcohol-kerosene solution with the brine concentrate results in a preferential dissolution of boron values into the organic phase as boric acid. Maximum extraction ordinarily takes place in a matter of about 1 to about 10 minutes/per pass at a temperature of from about 0° C. to about 50° C. In a preferred embodiment the temperature range for extraction is about 15° C to about 40° C.

Following the extraction step, the organic phase containing the boron, which coalesces on the surface once the mixing during the extraction step is stopped, is physically separated from the aqueous phase (or raffinate) containing the lithium. After the extraction step has been repeated a sufficient number of times to allow removal of boron to be completed, the pH of the raffinate aqueous phase will be less than 4.7. If desired, the boron can subsequently be stripped from the organic phase with water by conventional means known to one of skill in the art and the organic phase may then be recycled for reuse.

To provide a more pure lithium carbonate, the magnesium and calcium remaining in the raffinate aqueous phase preferably are removed, e.g., by precipitating them as insoluble components using well known chemical methods.

The resulting raffinate is then treated with sodium carbonate to precipitate lithium as lithium carbonate. At least a stoichiometric amount or a slight excess of carbonate may be used. This step may take place at a temperature between about 20° and about 95° C.

The present invention will be more readily understood from a consideration of the following specific examples. These examples are provided for illustration only and are not intended to limit the scope of the invention.

EXAMPLE

A lithium brine obtained from the Salar de Atacama region of Chile is used as a starting material for the process of the present invention. This brine is characterized by the following analysis:

| Li | 0.15 (% by weight) |
|---|---|
| Na | 7.17 |
| K | 1.85 |
| Mg | 0.96 |
| Ca | 0.031 |
| $SO_4$ | 1.46 |
| Cl | 16.04 |
| Br | 0.005 |
| B | 0.04 |

Excess sulfate is removed from this brine by conventional precipitation with $CaCl_2$ as gypsum.

The brine is then concentrated by the well known process of solar evaporation to a lithium concentration of about 6.30%, by weight. During concentration insoluble salts, other than lithium, are formed and precipitate out of solution. The brine has a pH of about 6.5, measured upon dilution of the concentrated brine with 10 volumes of water. Hydrochloric acid is used to adjust the pH to provide a resulting acidity of approximately pH2. During the process of the present invention, sufficient acid is added to the brine to convert any borates into boric acid.

The concentrated brine is contacted with an organic solution of 20%, by volume, of iso-octyl alcohol in kerosene at an organic to brine ratio of about 4 to 1, by volume. After mixing the two phases thoroughly with vigorous stirring for about 4 minutes, boron is extracted from the aqueous phase into the organic phase. Upon standing, the organic phase, which is less dense than the aqueous phase, coalesces at the surface of this mixture.

The remainder of the mixture, the aqueous phase or raffinate, settles to the bottom. The extraction coefficient of this process (i.e., the ratio of the weight percent of boron in the organic phase to the weight percent of boron in the aqueous phase) is between about 6 and about 14.

The organic phase, now containing the boron as boric acid, is removed and separated from the aqueous phase. The boron is stripped from the organic phase with water and the organic phase may be recycled for reuse.

As a result of three to four repeated extractions on the raffinate, the boron concentration in the aqueous phase (brine) is reduced from approximately 7,500 ppm to less than 1 ppm, and the resulting raffinate has a pH of less than 4.7.

The resulting substantially boron-free brine is then purified of any magnesium and calcium present by precipitation and liquid solids separation. To the resulting substantially boron-, magnesium- and calcium-free brine is added sodium carbonate in at least a stoichiometric amount to precipitate the lithium as lithium carbonate. The lithium carbonate is separated and dried.

The data in Table I below illustrates the composition of the lithium brine concentrate before and after boron extraction according to the process of the present invention:

TABLE I

| Chemical species | Brine Content | Brine Content after Boron Removal |
|---|---|---|
| Li | 6.30 | 6.03 |
| Na | 0.070 | 0.073 |
| K | 0.019 | 0.018 |
| Mg | 1.29 | 1.29 |
| Ca | 0.053 | 0.051 |
| B | 0.73 | 0.0001 |
| SO$_4$ | 0.016 | 0.019 |
| Cl | 35.86 | 34.46 |

Tests were also conducted to compare the contents of a brine treated conventionally to produce lithium carbonate without application of the process of the present invention to a brine treated according to the present invention. Results of this comparative test are illustrated in Table II below.

TABLE II

| | Chemical Analysis of Lithium Carbonate Produced From Brine | |
|---|---|---|
| Chemical Species | Without B Removal | With B Removal |
| Li$_2$CO$_3$(assay) | 99.3% | 99.57% |
| Ca | 0.04% | 0.008 |
| Mg | 0.008 | 0.002 |
| B | 0.05 | 0.0001 |
| Loss on Ignition, 550° C. | 0.53 | 0.35 |

Thus the method of the present invention results in a low boron lithium carbonate with a boron content of less than 0.02%. Preferably this process is conducted to provide a lithium carbonate product with a boron content of less than 0.002%.

Numerous modifications and variations in practice of this invention are expected to occur to those skilled in the art. Such modifications are believed to be encompassed by the appended claims of this invention.

What is claimed is:

1. The process of producing lithium carbonate with a low boron content from a lithium-containing brine which consists essentially of the steps of:
   (a) contacting a lithium chloride brine having a lithium content of from about 2 to about 7 percent, by weight, and which is saturated with respect to metal salt hydrates present in the brine, is substantially free of free water, and is at a pH of about 1-2 measured when diluted with 10 volumes of water, with an organic solution consisting essentially of from about 5 to about 50% by volume of a fatty alcohol containing from 6 to 16 carbon atoms in kerosene, at an organic solution-to-brine volume ratio of between about 1:1 and about 5:1, to extract boron from the brine into the organic phase;
   (b) separating said organic solution phase from said brine;
   (c) removing magnesium and calcium form said brine;
   (d) adding sodium carbonate to precipitate lithium carbonate from said brine; and
   (e) separating the resulting lithium carbonate therefrom.

2. The process of claim 1 wherein the amount of said fatty alcohol in said kerosene is between about 5 and about 20%, by volume.

3. The process of claim 1 wherein said fatty alcohol is contains from 7 to 12 carbon atoms.

4. The process of claim 3 wherein said fatty alcohol is iso-octyl alcohol.

5. The process of claim 1 wherein the organic solution to brine volume ratio is between about 2:1 and about 4:1.

6. The process of claim 1 wherein the brine is substantially free of sulfate.

7. The process of claim 1 wherein the amount of said fatty alcohol in said kerosene is between about 5 and about 20%, by volume; wherein said fatty alcohol contains from 7 to 12 carbon atoms; and wherein the organic solution to brine volume ratio is between about 2:1 and about 4:1.

8. The process of claim 7 wherein said fatty alcohol is iso-octyl alcohol.

9. The process of claim 7 wherein the brine is substantially free of sulfate.

10. The process of claim 9 wherein said fatty alcohol is iso-octyl alcohol.

11. The process of producing lithium carbonate with a low boron content from a lithium-containing brine which consists essentially of the steps:
   (a) contacting a lithium chloride brine having a lithium content of from about 2 to about 7.0 percent, by weight, and which is saturated with respect to metal salt hydrates present in the brine, is substantially free of free water, and is at a pH of about 1-2 measured when diluted with 10 volumes of water, with an organic solution of from about 10 to about 40% by volume of a fatty alcohol containing from 6 to 16 carbon atoms in kerosene at an organic solution to brine volume ratio of between about 1:1 and about 5:1, to extract boron from the brine into the organic solution phase;
   (b) separating said organic solution phase from said brine;
   (c) removing magnesium and calcium from said brine;
   (d) adding sodium carbonate to precipitate lithium carbonate from said brine; and
   (e) separating the resulting lithium carbonate therefrom.

* * * * *